(12) United States Patent
Streng et al.

(10) Patent No.: US 7,819,426 B2
(45) Date of Patent: Oct. 26, 2010

(54) OVER-CENTER LOCKING MECHANISM FOR STEERING COLUMN ASSEMBLY

(75) Inventors: Joseph R. Streng, Freeland, MI (US); Melvin L. Tinnin, Clio, MI (US); Damir Menjak, Frankenmuth, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 152 days.

(21) Appl. No.: 12/131,540

(22) Filed: Jun. 2, 2008

(65) Prior Publication Data
US 2009/0267336 A1    Oct. 29, 2009

Related U.S. Application Data

(60) Provisional application No. 61/047,627, filed on Apr. 24, 2008.

(51) Int. Cl.
*B62D 1/187* (2006.01)

(52) U.S. Cl. .......................... 280/775; 74/493; 280/777

(58) Field of Classification Search .................. 74/493; 280/775, 777
See application file for complete search history.

(56) References Cited

U.S. PATENT DOCUMENTS

| | | | |
|---|---|---|---|
| 6,419,269 B1 * | 7/2002 | Manwaring et al. | 280/775 |
| 6,616,185 B2 * | 9/2003 | Manwaring et al. | 280/775 |
| 6,659,504 B2 | 12/2003 | Riefe et al. | |
| 7,097,205 B2 | 8/2006 | Camp et al. | |
| 7,150,204 B2 | 12/2006 | Uphaus et al. | |
| 7,219,936 B1 * | 5/2007 | Willford | 294/61 |
| 7,275,765 B2 | 10/2007 | Camp et al. | |
| 7,325,467 B2 | 2/2008 | Breuss et al. | |
| 2002/0171235 A1 | 11/2002 | Riefe et al. | |
| 2004/0261565 A1 | 12/2004 | Uphaus et al. | |
| 2005/0016315 A1 | 1/2005 | Breuss et al. | |
| 2005/0029795 A1 | 2/2005 | Camp et al. | |
| 2005/0035584 A1 | 2/2005 | Camp et al. | |
| 2005/0104353 A1 * | 5/2005 | Ikeda et al. | 280/775 |
| 2005/0236825 A1 * | 10/2005 | Sawada et al. | 280/775 |
| 2006/0097501 A1 * | 5/2006 | Yoshimoto et al. | 280/777 |
| 2006/0151984 A1 * | 7/2006 | Higashino et al. | 280/775 |
| 2006/0163861 A1 * | 7/2006 | Higashino | 280/777 |
| 2006/0207380 A1 * | 9/2006 | Higashino | 74/493 |
| 2006/0230863 A1 | 10/2006 | Rouleau et al. | |
| 2008/0053264 A1 * | 3/2008 | Matsui et al. | 74/493 |
| 2008/0060467 A1 * | 3/2008 | Manwaring et al. | 74/493 |

* cited by examiner

*Primary Examiner*—Eric Culbreth
*Assistant Examiner*—Joseph Rocca
(74) *Attorney, Agent, or Firm*—Cantor Colburn LLP

(57) ABSTRACT

A steering column assembly includes a column jacket extending along a longitudinal axis. A mounting bracket is coupled to the column jacket and includes a first plate disposed adjacent the column jacket and a second plate disposed opposite the column jacket from the first plate. A first clamp shaft is coupled to and extends through the first plate along a first transverse axis. A second clamp shaft is coupled to and extends through the second plate along a second transverse axis. The first and second transverse axes intersect the column jacket. A cam mechanism is coupled to the first clamp shaft for moving the first clamp shaft axially along the first transverse axis. A bridge includes a generally U-shaped cross section partially encircling the column jacket to interconnect the first clamp shaft and the second clamp shaft for moving the second clamp shaft concurrently with the first clamp shaft.

19 Claims, 3 Drawing Sheets

OVER-CENTER LOCKING MECHANISM FOR STEERING COLUMN ASSEMBLY

CROSS REFERENCE TO RELATED APPLICATION

This application claims the benefit of U.S. Provisional Patent Application Ser. No. 61/047,627, filed on Apr. 24, 2008, the disclosure of which is hereby incorporated by reference.

BACKGROUND OF THE INVENTION

1. Field of the Invention

The subject invention generally relates to a steering column assembly for a vehicle. More specifically, the subject invention relates to an adjustable steering column assembly adjustable in at least one of longitudinal direction along a longitudinal axis and a pivotable direction transverse to the longitudinal axis.

2. Description of the Prior Art

Adjustable steering column assemblies include a locking mechanism to secure the position of a column jacket relative to a mounting bracket. The locking mechanism often employs a friction/compression locking device that applies a compressive force to compress the mounting bracket against the column jacket to hold the column jacket in place. The locking mechanism may additionally employ a positive locking device, such as interlocking teeth between members. The positive locking device holds the position of the column jacket relative to the mounting bracket in place during collapse of the steering column assembly during an impact event, such as during a vehicular collision.

Typically, the locking mechanism includes a bolt or shaft extending across the column jacket, transverse to the longitudinal axis, to operate the friction locking device and/or the positive locking device. The bolt or shaft is disposed above or below the column jacket. However, this configuration of the bolt and the various locking devices arranged above or below the column jacket require a significant amount of space.

U.S. Pat. No. 7,097,205 discloses a steering column assembly having a locking mechanism disposed along an axis that intersects the column jacket. However, the locking mechanism is not capable of applying a compressive force or actuating other locking devices on both sides of the column jacket, i.e., the locking mechanism is configured to only operate on one side of the column jacket.

SUMMARY OF THE INVENTION AND ADVANTAGES

The subject invention provides a steering column assembly for a vehicle. The steering column assembly comprises a column jacket. The column jacket extends along a longitudinal axis. A mounting bracket is coupled to the column jacket. The mounting bracket includes a first plate disposed on one side of the column jacket and a second plate disposed on an opposing side of the column jacket relative to the first plate. The mounting bracket is configured for attachment to the vehicle. A first clamp shaft is coupled to and extends through the first plate along a first transverse axis. The first transverse axis intersects the column jacket and is transverse to the longitudinal axis. A second clamp shaft is coupled to and extends through the second plate along a second transverse axis. The second transverse axis intersects the column jacket and is transverse to the longitudinal axis. A cam mechanism is coupled to the first clamp shaft. The cam mechanism axially moves the first clamp shaft along the first transverse axis. The first clamp shaft moves between a lock position and a release position. The lock position compresses the first plate against the column jacket, thereby fixing a position of the column jacket relative to the mounting bracket. The release position releases the first plate from the column jacket to permit movement of the column jacket relative to the mounting bracket. A bridge extends across the column jacket. The bridge interconnects the first clamp shaft and the second clamp shaft to transmit the axial movement of the first clamp shaft along the first transverse axis between the lock position and the release position to the second clamp shaft along the second transverse axis for moving the second clamp shaft concurrently with the first clamp shaft.

Accordingly, the subject invention provides a steering column assembly having a first clamp shaft and a second clamp shaft each aligned along an axis that intersects the column jacket, i.e., the first clamp shaft and the second clamp shaft are not disposed above or below the column jacket. A bridge interconnects the first clamp shaft and the second clamp shaft to permit locking devices to operate through a single cam mechanism on both sides of the column jacket, thereby reducing the spacing requirements of the steering column assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle, and is telescopically adjustable in a longitudinal direction along a longitudinal axis 22 and pivotably adjustable in tilt direction transverse to the longitudinal axis 22. The steering column assembly 20 rotatably supports a steering wheel (not shown) as is well known.

Figure 1:
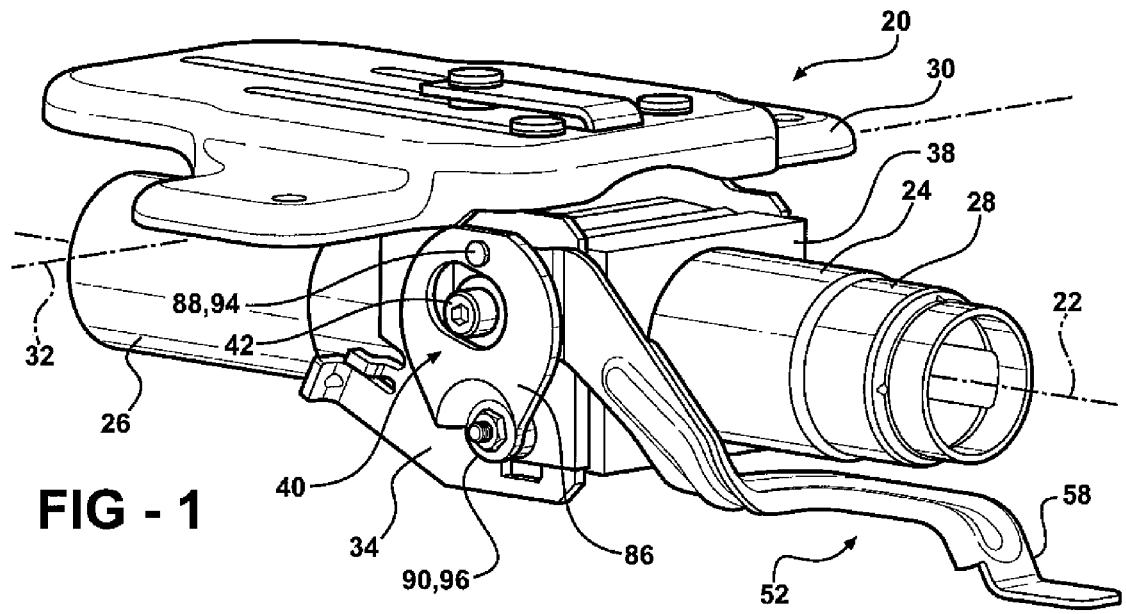
FIG. 1 is a perspective view of a steering column assembly in a locked position.
Figure 2:
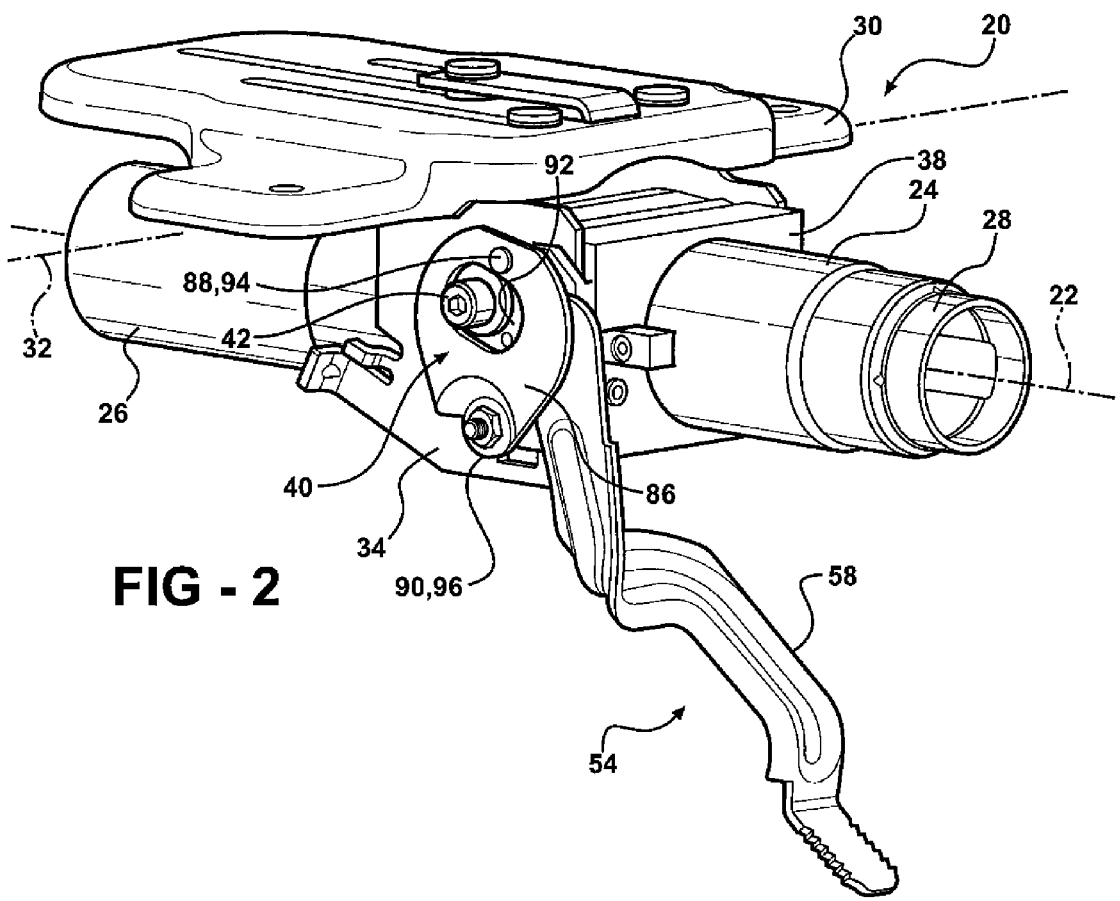
FIG. 2 is a perspective view of the steering column assembly in an unlocked position.

Referring to FIGS. 1 and 2, the steering column assembly 20 comprises a column jacket 24. The column jacket 24 extends along the longitudinal axis 22. Preferably, the column jacket 24 includes a lower column jacket 26 and an upper column jacket 28. The upper column jacket 28 is telescopically moveable along the longitudinal axis 22 relative to the lower column jacket 26 to adjust a longitudinal position of the steering wheel. Preferably, the column jacket 24 includes a circular cross section. However, it should be appreciated that the column jacket 24 may include some other cross sectional shape.

A mounting bracket 30 is coupled to the column jacket 24. The mounting bracket 30 is configured for attachment to the vehicle. It should be appreciated that the mounting bracket 30 may be configured in any suitable manner, and may include a single bracket of multiple brackets cooperating together to mount the column jacket 24 to the vehicle. The mounting bracket 30 defines a tilt axis 32 about which the column jacket 24 pivots to adjust a vertical position of the steering wheel as is well known. The mounting bracket 30 includes a first plate 34 and a second plate 36. The first plate 34 is disposed adjacent the column jacket 24 in a generally vertical position, along one side of the column jacket 24. The second plate 36 is generally parallel to the first plate 34 in a generally vertical position, and is disposed opposite the column jacket 24 relative to the first plate 34, on an opposing side of the column jacket 24 and adjacent thereto.

Figure 3:
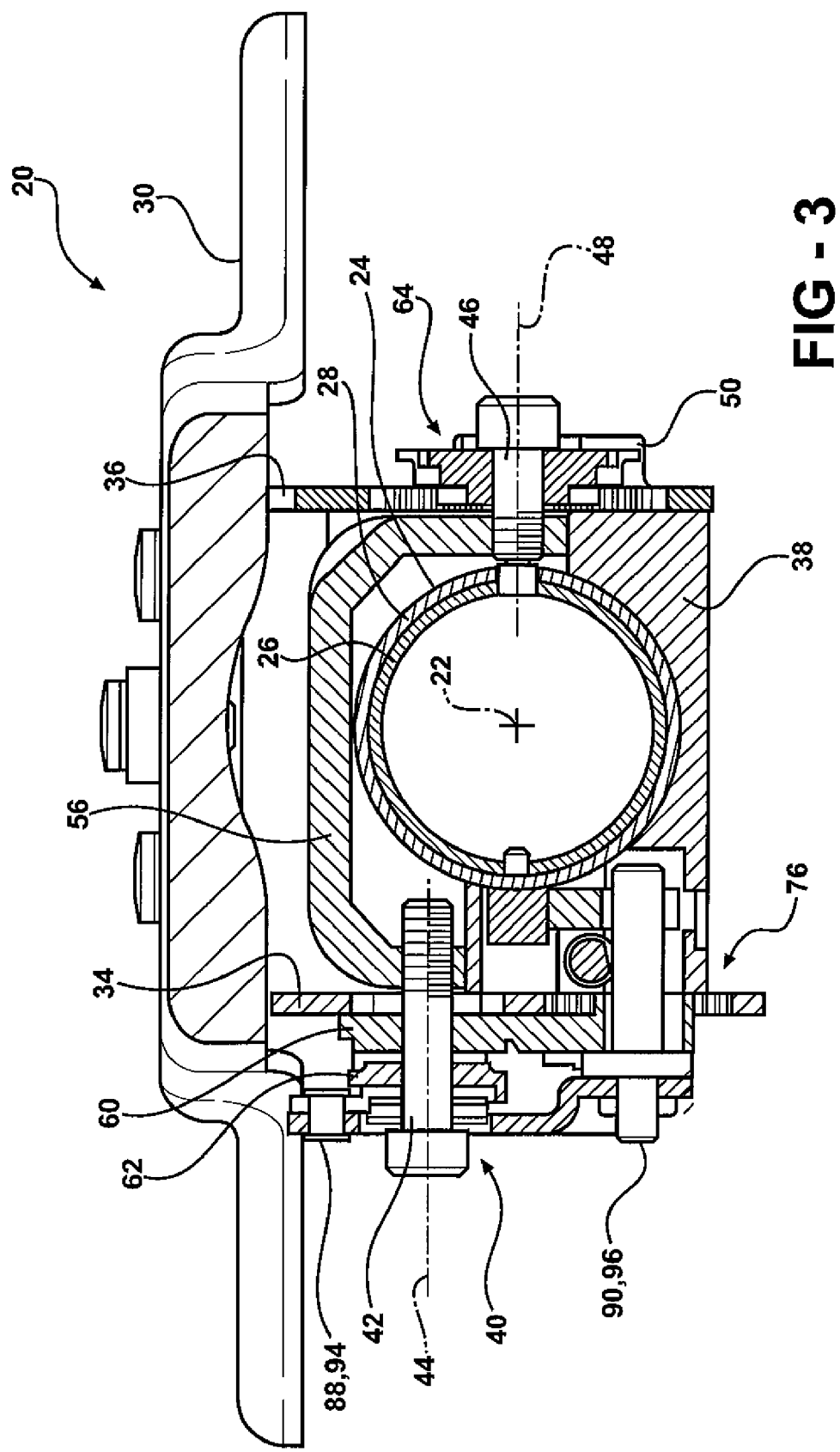
FIG. 3 is a cross section view of the steering column assembly.

Referring also to FIG. 3, the column jacket 24 includes a compression block 38. The compression block 38 is disposed between the first plate 34 and the second plate 36. A cam mechanism 40 (described below) works to compress the first plate 34 and the second plate 36 towards each other, thereby compressing the compression block 38 therebetween. During normal operating conditions when the first plate 34 and the second plate 36 are compressed against the compression block 38, the friction between the compression block 38, the first plate 34 and second plate 36 prevents movement of the column jacket 24 relative to the mounting bracket 30. When the first plate 34 and the second plate 36 are not compressed against the compression block 38, the column jacket 24 is free to move relative to the mounting bracket 30.

A first clamp shaft 42 is coupled to the first plate 34. The first clamp shaft 42 extends through the first plate 34 along a first transverse axis 44. The first transverse axis 44 intersects the column jacket 24 and is transverse to the longitudinal axis 22, i.e., the first transverse axis 44 does not extend above or below the column jacket 24, but rather extends through the column jacket 24. Accordingly, it should be appreciated that the first clamp shaft 42 us unable to extend between the first plate 34 and the second plate 36, as the column jacket 24 is deposed along the first transverse axis 44 between the first plate 34 and the second plate 36.

A second clamp shaft 46 is coupled to the second plate 36. The second clamp shaft 46 extends through the second plate 36 along a second transverse axis 48. The second transverse axis 48 intersects the column jacket 24 and is transverse to the longitudinal axis 22, i.e., the second transverse axis 48 does not extend above or below the column jacket 24, but rather extends through the column jacket 24. Accordingly, it should be appreciated that the second clamp shaft 46 us unable to extend between the first plate 34 and the second plate 36, as the column jacket 24 is disposed along the second transverse axis 48 between the first plate 34 and the second plate 36.

Preferably, the first transverse axis 44 is parallel to the second transverse axis 48. However, it should be appreciated that the first transverse may be disposed in a non-parallel relationship relative to the second transverse axis 48. As shown, the first transverse axis 44 is not co-linear with the second transverse axis 48. However, it should be appreciated that the first transverse axis 44 and the second transverse axis 48 may be collinear with each other.

A retainer 50 couples the second clamp shaft 46 to the second plate 36. The retainer 50 positions the second clamp shaft 46 relative to the second plate 36, and assists in guiding the second clamp shaft 46 relative to the second plate 36.

A bridge 56 interconnects the first clamp shaft 42 and the second clamp shaft 46. The bridge 56 includes a generally U-shaped cross section transverse to the longitudinal axis 22. The bridge 56 extends across and partially encircles the column jacket 24. Accordingly, the generally U-shaped cross section permits the first clamp shaft 42 to be connected to the second clamp shaft 46 even though the column jacket 24 is disposed between. As such, the bridge 56 wraps around the column jacket 24 to connect the first clamp shaft 42 to the second clamp shaft 46. The bridge 56 is coupled to the first clamp shaft 42 for axial movement with the first clamp shaft 42 along the first transverse axis 44. The bridge 56 is coupled to the second clamp shaft 46 for axial movement with the second clamp shaft 46 along the second transverse axis 48. Accordingly, the bridge 56 transmits the axial movement of the first clamp shaft 42 along the first transverse axis 44 between a lock position 52, shown in FIG. 1, and a release position 54, shown in FIG. 2, to the second clamp shaft 46 along the second transverse axis 48. Therefore, as the first clamp shaft 42 moves in a first direction along the first transverse axis 44 relative to the column jacket 24, the bridge 56 transfers that movement to the second clamp shaft 46 to also move the second clamp shaft 46 in the first direction. Likewise, as the first clamp shaft 42 moves in a second direction along the first transverse axis 44 opposite the first direction, the bridge 56 transfers that movement to the second clamp shaft 46 to also move the second clamp shaft 46 in the second direction. It should be appreciated that the bridge 56 directly transfers the movement between the first clamp shaft 42 and the second clamp shaft 46, i.e., the bridge 56 moves the second clamp shaft 46 the same distance that the first clamp shaft 42 is moved.

A lever 58 is coupled to the first clamp shaft 42. The lever 58 is rotatable about the first transverse axis 44. The lever 58 is coupled to the first clamp shaft 42 for axial movement with the first clamp shaft 42. However, the first clamp shaft 42 need not rotate with the lever 58. It should be appreciated that the lever 58 may rotate about the first transverse axis 44 relative to the first clamp shaft 42. Alternatively, the first clamp shaft 42 may be fixed for rotation with the lever 58 and be rotatable about the first transverse axis 44 relative to the bridge 56. Accordingly, it should be appreciated that the first clamp shaft 42 must be rotatable relative to at least one of the lever 58 and the bridge 56, and must also be axially moveable along the first transverse axis 44 with both the lever 58 and the bridge 56. Similarly, the bridge 56 must be fixed to the second clamp shaft 46 for axial movement with the second clamp shaft 46 along the second transverse axis 48, but is rotatably coupled to the second clamp shaft 46 to permit the second clamp shaft 46 to rotate about the second transverse axis 48 relative to the bridge 56.

The lever 58 is also coupled to the cam mechanism 40 to move the cam mechanism 40 between the lock position 52 and the release position 54. The cam mechanism 40 is coupled to the first clamp shaft 42. As best shown in FIG. 3, the cam mechanism 40 includes a cam plate 60 coupled to the first plate 34 and a cam follower 62 coupled to the lever 58. The cam follower 62 is rotatable with the lever 58 about the first transverse axis 44 relative to the cam plate 60. The cam plate 60 provides a cam surface that moves the cam follower 62 and thereby the first clamp shaft 42 axially along the first transverse axis 44. Accordingly, as the lever 58 is rotated about the first transverse axis 44, the lever 58 and the cam follower 62 move axially along the first transverse axis 44. As the first clamp shaft 42 is coupled for axial movement with the lever 58, the first clamp shaft 42 also moves along the first transverse axis 44 in response to rotation of the lever 58 about the first transverse axis 44. The cam mechanism 40 axially moves the first clamp shaft 42 along the first transverse axis 44 and the second clamp shaft 46 along the second transverse axis 48 between the lock position 52 and the release position 54. The lock position 52 compresses the first plate 34 and the second plate 36 against the compression block 38. Accordingly, the lock position 52 fixes a position of the column jacket 24 relative to the mounting bracket 30. The release position 54 releases the first plate 34 and the second plate 36 from the compression block 38. Accordingly, the release position 54 permits movement of the column jacket 24 relative to the mounting bracket 30.

The steering column assembly 20 further includes a rake lock mechanism 64. The rake lock mechanism 64 is coupled to at least one of the first clamp shaft 42 and the second clamp shaft 46. The rake lock mechanism 64 is moveable in response to collapse of the column jacket 24 during an impact event. The rake lock mechanism 64 is moveable between a rake lock position and a rake release position. The rake lock position prevents pivotable movement of the column jacket 24 transverse to the longitudinal axis 22. The rake release position permits the pivotable movement of the column jacket 24 transverse to the longitudinal axis 22.

At least one of the first plate 34 and the second plate 36 defines a rake slot 68 having a plurality of rake slot teeth 70. Preferably, both the first plate 34 and the second plate 36 define a rake slot 68, with the first clamp shaft 42 extending through the rake slot 68 defined by the first plate 34 and the second clamp shaft 46 extending through the rake slot 68 defined by the second plate 36. A rake lock 66 is coupled to the second clamp shaft 46. At least one of the cam plate 60 and the rake lock 66 include a plurality of rake lock teeth 72. Preferably, both the cam plate 60 and the rake lock 66 include the rake lock teeth 72. The rake lock teeth 72 engage the rake slot teeth 70 in response to collapse of the column jacket 24 during an impact event.

The at least one of the cam plate 60 and the rake lock 66 that includes the rake lock teeth 72 includes a guidance feature. If both the cam plate 60 and the rake lock 66 include the rake lock teeth 72, than both the cam plate 60 and the rake lock 66 may include the guidance feature. The guidance feature spaces the rake lock teeth 72 from the rake slot teeth 70 prior to collapse of the column jacket 24 during the impact event. The guidance feature is frangible upon collapse of the column jacket 24 during the impact event to permit interlocking engagement between the rake lock teeth 72 and the rake slot teeth 70. Accordingly, during occurrence of the impact event, the column jacket 24 collapses. In response to the column jacket 24 collapsing, the guidance feature is fractured, thereby allowing the rake lock teeth 72 to engage the rake slot teeth 70. The interlocking engagement between the rake lock teeth 72 and the rake slot teeth 70 prevents movement of the column jacket 24 relative to the mounting bracket 30 during the impact event. It should be appreciated that while the compression force applied by the cam mechanism 40 compresses the first plate 34 and the second plate 36 against the compression block 38 to fix the position of the column jacket 24 relative to the mounting bracket 30, this compressive force may not be great enough to hold the position of the column jacket 24 relative to the mounting bracket 30 during the impact event.

Figure 4:
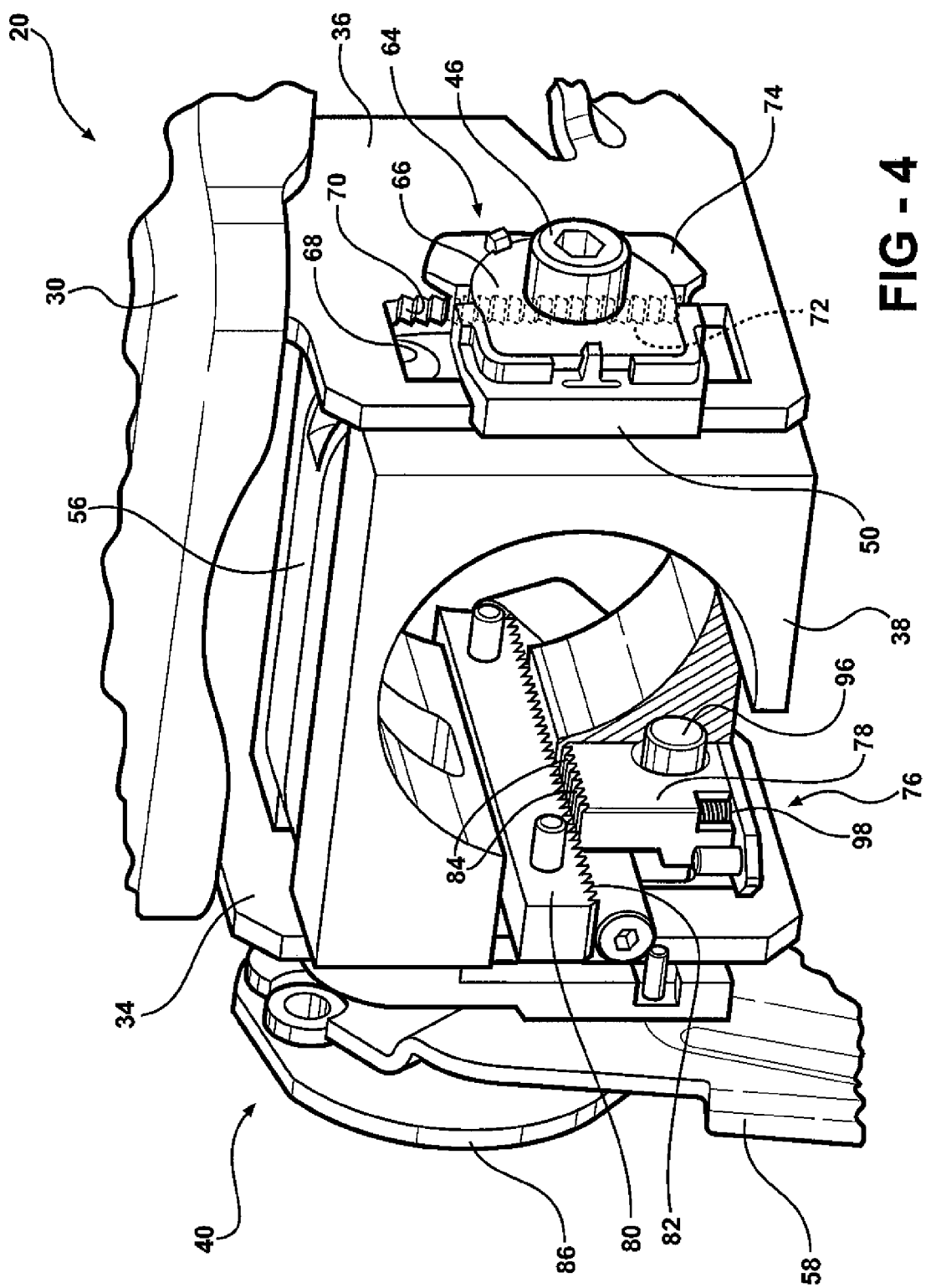
FIG. 4 is a partial perspective view of the steering column assembly with a column jacket removed for clarity.

Referring also to FIG. 4, the steering column assembly 20 further includes a telescope lock mechanism 76. The telescope locking mechanism is coupled to the lever 58, and is moveable between a telescope lock position and a telescope release position. The telescope lock mechanism 76 is moveable between the telescope lock position and the telescope release position in response to rotation of the lever 58 about the first transverse axis 44. The telescope lock position prevents longitudinal movement of the column jacket 24 along the longitudinal axis 22. The telescope release position permits the longitudinal movement of the column jacket 24 along the longitudinal axis 22.

The telescope lock mechanism 76 includes a column jacket lock 80. The column jacket lock 80 is mounted to the column jacket 24 and includes a plurality of column jacket teeth 82 extending along the longitudinal axis 22. The telescope lock mechanism 76 further includes a telescope lock 78. The telescope lock 78 is coupled to the mounting bracket 30. The telescope lock 78 is coupled to the first plate 34 of the mounting bracket 30. More specifically, the telescope lock 78 is coupled to the compression block 38, which is coupled to the first plate 34 of the mounting bracket 30. The telescope lock 78 includes a plurality of telescope lock teeth 84. The telescope lock teeth 84 engage the column jacket teeth 82 in interlocking engagement when the telescope lock mechanism 76 is in the telescope lock position. The telescope lock teeth 84 are disengaged from the column jacket teeth 82 when the telescope lock mechanism 76 is in the telescope release position. Accordingly, when in the telescope lock position, the interlocking engagement between the column jacket teeth 82 and the telescope lock teeth 84 prevents movement of the column jacket 24 along the longitudinal axis 22 relative to the mounting bracket 30. It should be appreciated that while the compression force applied by the cam mechanism 40 compresses the first plate 34 and the second plate 36 against the compression block 38 to fix the position of the column jacket 24 relative to the mounting bracket 30, this compressive force may not be great enough to hold the position of the column jacket 24 relative to the mounting bracket 30 during the impact event. However, the interlocking engagement between the column jacket teeth 82 and the telescope lock teeth 84 ensures that the column jacket 24 is unable to move during collapse of the column jacket 24 during the impact event.

A telescope cam 86 is coupled to the lever 58 and also coupled to the telescope lock 78. The telescope cam 86 is coupled to the lever 58 at a first attachment point 88. The first attachment point 88 is spaced from the first transverse axis 44, and generally disposed vertically above the first transverse axis 44. The telescope cam 86 is coupled to the telescope lock 78 at a second attachment point 90. The telescope cam 86 is spaced from the first transverse axis 44, and disposed opposite the first transverse axis 44 relative to the first attachment point 88, i.e., generally vertically below the first transverse axis 44.

The telescope cam 86 defines a telescope cam slot 92. The cam follower 62 is disposed and moveable within the telescope cam slot 92. Movement of the telescope cam 86 moves the telescope lock 78 coupled thereto into and out of engagement with the column jacket lock 80.

A lever pin 94 rotatably interconnects the lever 58 and the telescope cam 86 at the first attachment point 88. A lock pin 96 rotatably interconnects the telescope cam 86 and the telescope lock 78 at the second attachment point 90. A spring 98 is disposed between the compression block 38 and the telescope lock 78 for biasing the telescope lock 78 into engagement with the column jacket lock 80. Preferably, the spring 98 includes a coil spring 98. However, it should be appreciated that the spring 98 may include some other type or configuration of spring 98.

In operation, the lever 58 is rotated from a locked position into an unlocked position. The lever 58 and the cam follower 62 rotate about the first transverse axis 44. The telescope cam 86 is attached to the lever 58 at the first attachment point 88 spaced vertically above the first transverse axis 44, thereby providing leverage to move the telescope cam 86. Because the first attachment point 88 is spaced from the first transverse axis 44, about which the lever 58 rotates, the telescope cam 86 is forced to rotate. The telescope cam 86 is attached to the telescope lock 78 at the second attachment point 90. The telescope cam 86 rotates about the second attachment point 90 because the second attachment point 90 is axially fixed along the longitudinal axis 22. The downward movement of the telescope cam 86 also moves the telescope lock 78 attached thereto downward and out of engagement with the column jacket lock 80. Rotating the lever 58 from the unlocked position to the locked position reverses the above described motion and moves the telescope lock 78 back into engagement with the column jacket lock 80.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
    a column jacket extending along a longitudinal axis;
    a mounting bracket coupled to said column jacket and including a first plate disposed on one side of said column jacket and a second plate disposed on an opposing side of said column jacket relative to said first plate with said mounting bracket configured for attachment to the vehicle;
    a first clamp shaft coupled to and extending through said first plate along a first transverse axis intersecting said column jacket and transverse to said longitudinal axis;
    a second clamp shaft coupled to and extending through said second plate along a second transverse axis intersecting said column jacket and transverse to said longitudinal axis;
    a cam mechanism coupled to said first clamp shaft for axially moving said first clamp shaft along said first transverse axis between a lock position compressing said first plate against said column jacket to fix a position of said column jacket relative to said mounting bracket and a release position releasing said first plate from said column jacket to permit movement of said column jacket relative to said mounting bracket;
    a telescope lock mechanism coupled to said lever and moveable between a telescope lock position preventing longitudinal movement of said column jacket along said longitudinal axis and a telescope release position permitting said longitudinal movement of said column jacket along said longitudinal axis, said telescope lock mechanism including a column jacket lock mounted to said column jacket;
    a bridge extending across said column jacket and interconnecting said first clamp shaft and said second clamp shaft to transmit said axial movement of said first clamp shaft along said first transverse axis between said lock position and said release position to said second clamp shaft along said second transverse axis for moving said second clamp shaft concurrently with said first clamp shaft; a lever coupled to said first clamp shaft and said cam mechanism for rotation about said first transverse axis to move said cam mechanism between said lock position and said release position, said cam mechanism including a cam plate coupled to said first plate and a cam follower coupled to and rotatable with said lever about said first transverse axis; and
    a telescope cam defining a telescope cam slot with said cam follower disposed and moveable within said telescope cam slot to move said telescope lock into and out of engagement with said column jacket lock.

2. An assembly as set forth in claim 1 wherein said bridge includes a generally U-shaped cross section transverse to said longitudinal axis.

3. An assembly as set forth in claim 1 wherein said first transverse axis is parallel to said second transverse axis.

4. An assembly as set forth in claim 1 wherein said first transverse axis and said second transverse axis are collinear.

5. An assembly as set forth in claim 1 wherein said column jacket includes a compression block disposed between said first plate and said second plate.

6. An assembly as set forth in claim 1 further comprising a lever coupled to said first clamp shaft and said cam mechanism for rotation about said first transverse axis to move said cam mechanism between said lock position and said release position.

7. An assembly as set forth in claim 6 wherein said cam mechanism includes a cam plate coupled to said first plate and a cam follower coupled to and rotatable with said lever about said first transverse axis.

8. An assembly as set forth in claim 7 further comprising a retainer for positioning said second clamp shaft relative to said second plate.

9. An assembly as set forth in claim 1 further comprising a rake lock mechanism coupled to one of said first clamp shaft and said second clamp shaft and moveable in response to an impact event between a rake lock position preventing pivotable movement of said column jacket transverse to said longitudinal axis and a rake release position permitting said pivotable movement of said column jacket transverse to said longitudinal axis.

10. An assembly as set forth in claim 9 wherein at least one of said first plate and said second plate defines a rake slot having a plurality of rake slot teeth.

11. An assembly as set forth in claim 10 further comprising a rake lock coupled to said second clamp shaft.

12. An assembly as set forth in claim 11 wherein at least one of said cam plate and said rake lock include a plurality of rake lock teeth for engaging said rake slot teeth in response to collapse of said column jacket during an impact event.

13. An assembly as set forth in claim 1 wherein said telescope lock mechanism includes a telescope lock coupled to said mounting bracket and including a plurality of telescope lock teeth for engaging said column jacket teeth when said telescope lock mechanism is in said telescope lock position and disengaged from said column jacket teeth when said telescope lock mechanism is in said telescope release position.

14. A steering column assembly for a vehicle, said assembly comprising:
    a column jacket extending along a longitudinal axis;
    a mounting bracket coupled to said column jacket and including a first plate disposed on one side of said column jacket and a second plate disposed on an opposing side of said column jacket relative to said first plate with said mounting bracket;
    a first clamp shaft coupled to and extending through said first plate along a first transverse axis;
    a second clamp shaft coupled to and extending through said second plate along a second transverse axis;
    a cam mechanism coupled to said first clamp shaft for axially moving said first clamp shaft along said first transverse axis between a lock position compressing said first plate against said column jacket to fix a position of said column jacket relative to said mounting bracket and a release position releasing said first plate from said column jacket to permit movement of said column jacket relative to said mounting bracket;

a bridge extending across said column jacket and interconnecting said first clamp shaft and said second clamp shaft to transmit said axial movement of said first clamp shaft along said first transverse axis between said lock position and said release position to said second clamp shaft along said second transverse axis for moving said second clamp shaft concurrently with said first clamp shaft;

a lever coupled to said first clamp shaft and said cam mechanism for rotation about said first transverse axis to move said cam mechanism between said lock position and said release position, said cam mechanism including a cam plate coupled to said first plate and a cam follower coupled to and rotatable with said lever about said first transverse axis;

a telescope lock mechanism coupled to said lever and moveable between a telescope lock position preventing longitudinal movement of said column jacket along said longitudinal axis and a telescope release position permitting said longitudinal movement of said column jacket along said longitudinal axis, said telescope lock mechanism including a column jacket lock mounted to said column jacket and including a plurality of column jacket teeth extending along said longitudinal axis, said telescope lock mechanism including a telescope lock coupled to said mounting bracket and including a plurality of telescope lock teeth for engaging said column jacket teeth when said telescope lock mechanism is in said telescope lock position and disengaged from said column jacket teeth when said telescope lock mechanism is in said telescope release position; and a telescope cam defining a telescope cam slot with said cam follower disposed and moveable within said telescope cam slot to move said telescope lock into and out of engagement with said column jacket lock.

15. An assembly as set forth in claim 14 wherein said telescope cam is coupled to said lever at a first attachment point spaced from said first transverse axis and is coupled to said telescope lock at a second attachment point spaced from said first transverse axis opposite said first transverse axis relative to said first attachment point.

16. An assembly as set forth in claim 15 further comprising a lever pin rotatably interconnecting said lever and said telescope cam at said first attachment point.

17. An assembly as set forth in claim 16 further comprising a lock pin rotatably interconnecting said telescope cam and said telescope lock.

18. An assembly as set forth in claim 17 further comprising a spring disposed between said compression block and said telescope lock for biasing said telescope lock into engagement with said column jacket lock.

19. A steering column assembly for a vehicle, said assembly comprising:
   a column jacket extending along a longitudinal axis;
   a mounting bracket coupled to said column jacket and including a first plate disposed on one side of said column jacket and a second plate disposed on an opposing side of said column jacket relative to said first plate with said mounting bracket;
   a first clamp shaft coupled to and extending through said first plate along a first transverse axis;
   a second clamp shaft coupled to and extending through said second plate along a second transverse axis;
   a cam mechanism coupled to said first clamp shaft for axially moving said first clamp shaft along said first transverse axis between a lock position compressing said first plate against said column jacket to fix a position of said column jacket relative to said mounting bracket and a release position releasing said first plate from said column jacket to permit movement of said column jacket relative to said mounting bracket,
   a telescope lock mechanism coupled to said lever and moveable between a telescope lock position preventing longitudinal movement of said column jacket along said longitudinal axis and a telescope release position permitting said longitudinal movement of said column jacket along said longitudinal axis, said telescope lock mechanism includes a column jacket lock mounted to said column jacket;
   a bridge extending across said column jacket and interconnecting said first clamp shaft and said second clamp shaft to transmit said axial movement of said first clamp shaft along said first transverse axis between said lock position and said release position to said second clamp shaft along said second transverse axis for moving said second clamp shaft concurrently with said first clamp shaft; a lever coupled to said first clamp shaft and said cam mechanism for rotation about said first transverse axis to move said cam mechanism between said lock position and said release position, said cam mechanism including a cam plate coupled to said first plate and a cam follower coupled to and rotatable with said lever about said first transverse axis; and
   a telescope cam defining a telescope cam slot with said cam follower disposed and moveable within said telescope cam slot to move said telescope lock into and out of engagement with said column jacket lock.

* * * * *